United States Patent [19]
Toyozumi et al.

[11] Patent Number: 5,357,169
[45] Date of Patent: Oct. 18, 1994

[54] SWITCHING APPARATUS FOR AN INTERIOR LIGHT IN A MOTOR VEHICLE

[75] Inventors: Morihiko Toyozumi; Nobuya Inamori, both of Mie, Japan

[73] Assignee: Sumitomo Wiring Systems, Ltd., Yokkaichi, Japan

[21] Appl. No.: 965,025

[22] Filed: Oct. 23, 1992

[30] Foreign Application Priority Data

Oct. 25, 1991 [JP] Japan .................................. 3-307025

[51] Int. Cl.$^5$ .......................... B60Q 1/00; B60Q 7/00
[52] U.S. Cl. ........................................ 315/77; 315/84; 307/10.8
[58] Field of Search .................. 315/77, 84, 260; 307/10.8; 362/80

[56] References Cited

U.S. PATENT DOCUMENTS

| | | |
|---|---|---|
| 4,122,371 | 10/1978 | Talmage et al. .......................... 315/84 |
| 4,123,668 | 10/1978 | Pecota ................................ 307/10 LS |
| 4,403,172 | 9/1983 | Sasaki et al. ............................ 315/84 |
| 4,473,781 | 9/1984 | Fuchshuber ........................... 362/276 |
| 4,517,469 | 5/1985 | Bier ................................... 307/10 LS |
| 4,638,174 | 1/1987 | Bier ................................... 307/10 LS |
| 4,866,345 | 9/1989 | Katsoka ................................. 315/84 |
| 5,047,688 | 9/1991 | Alten .................................... 315/84 |

FOREIGN PATENT DOCUMENTS

| | | |
|---|---|---|
| 0059914 | 2/1982 | European Pat. Off. . |
| 2810659 | 9/1979 | Fed. Rep. of Germany ........ 315/84 |
| 2854480 | 6/1980 | Fed. Rep. of Germany . |
| 3620861 | 12/1987 | Fed. Rep. of Germany . |
| 0110536 | 8/1979 | Japan ..................................... 315/84 |
| 9067132 | 4/1984 | Japan .................................. 307/10.8 |
| 0181736 | 8/1986 | Japan ..................................... 315/84 |

*Primary Examiner*—William L. Sikes
*Assistant Examiner*—Jim A. Dudek
*Attorney, Agent, or Firm*—Sughrue, Mion, Zinn, Macpeak & Seas

[57] ABSTRACT

A switching apparatus for an interior light in a motor vehicle allows a user to set a delay period from the time when an off command was issued to a room light in the motor vehicle to the time when the light is actually turned off. The switching apparatus turns on and off a room light R in the motor vehicle. The switching apparatus comprises a limit switch 1 for issuing the off command to the room light R when a door is opened, a delay circuit 3 for generating a delay period from the time when the off command as issued to the light R to the time when the light R is to be turned off, and a regulator 4 for regulating the delay period generated by the delay circuit 3. It is possible for the user to set a desired lighting period by regulating the delay period, giving the motor vehicle high quality and versatility.

11 Claims, 5 Drawing Sheets

5,357,169

SWITCHING APPARATUS FOR AN INTERIOR LIGHT IN A MOTOR VEHICLE

BACKGROUND OF THE INVENTION

1. Field of the Invention

This invention relates to a switching apparatus for an interior light, such as a room light the like, in a motor vehicle and, in particular, to a switching apparatus for an interior light in a motor vehicle, in which the interior light is turned off after a predetermined delay period from the time when an off command is issued.

2. Statement of the Prior Art

A room light is provided in a motor vehicle to illuminate the interior of the vehicle, for example, in order to see a map at night.

A conventional room light is turned on and off when a user turns on and off a switch provided between the room light and a battery in the motor vehicle.

However, it has been recognized lately that the room light should be used immediately before and after getting into and out of the motor vehicle. Consequently, motor vehicles have been provided with a switching apparatus which automatically turns on and off the room light when the door is opened and closed. This switching apparatus includes a manual three-position changing-over switch provided between the room light and the ground, and a normal open type limit switch which turns on and off upon opening and closing the door.

When the changing-over switch in the switching apparatus is set to the first changing-over position, the room light is connected to the battery and is always turned on, regardless of the opening and closing of the door. When the changing-over switch is set in the second changing-over position, the limit switch is closed to turn the room light on if the door is opened and the limit switch is opened to turn the light off if the door is closed. Further, when the changing-over switch is set in the third changing-over position, the room light is always turned off irrespective of the opening and closing of the door. Accordingly, this switching apparatus turns the room light off and on when the door is closed and opened by opening and closing the limit switch.

However, since the switching apparatus turns the room light on or off simultaneously with the opening or closing of the door, the room light is turned off as soon as the user gets into the motor vehicle and closes the door. If the user wishes to do something immediately after getting into the motor vehicle, the user must either keep the door open or change the changing-over switch from the second or third changing-over position to the first changing-over position, which always turns the room light on.

Thus, recently, there is a motor vehicle provided with a switching apparatus in which the root light is kept on for a predetermined period of time even after the user gets into the motor vehicle and closes the door. However, it is impossible to uniformly determine the period of lighting after closing the door, since there are various users' choices, purposes for use of the motor vehicle, places and circumstances of getting into and out of the vehicle, and the like. That is, the switching apparatus which turns on the room light for a predetermined period of time after closing the door cannot sufficiently meet the requirements of all users.

SUMMARY OF THE INVENTION

An object of the present invention is to provide a switching apparatus for an interior light in a motor vehicle, which can change the delay period from the time when an off command was issued to the time when the light is actually turned off in compliance with the user's choice.

In order to achieve the above object, the switching apparatus for the interior light in the present invention, by which the room light in a motor vehicle is turned on and off, comprises: means for issuing an off command to the light; means for generating a delay period from the time when the off command was issued to the time when the light is to be turned off; and means for regulating the delay period generated by the delay means.

In accordance with the above-described construction of the present invention, when the off command is issued to the light, the light will turn off after the lapse of the delay period, regulated by the regulating means, from the issue of the off command.

DETAILED DESCRIPTION OF THE PREFERRED EMBODIMENTS

Referring now to FIGS. 1 to 7, embodiments of a switching apparatus for an interior light in a motor vehicle in accordance with the present invention will be explained below.

Figure 1:
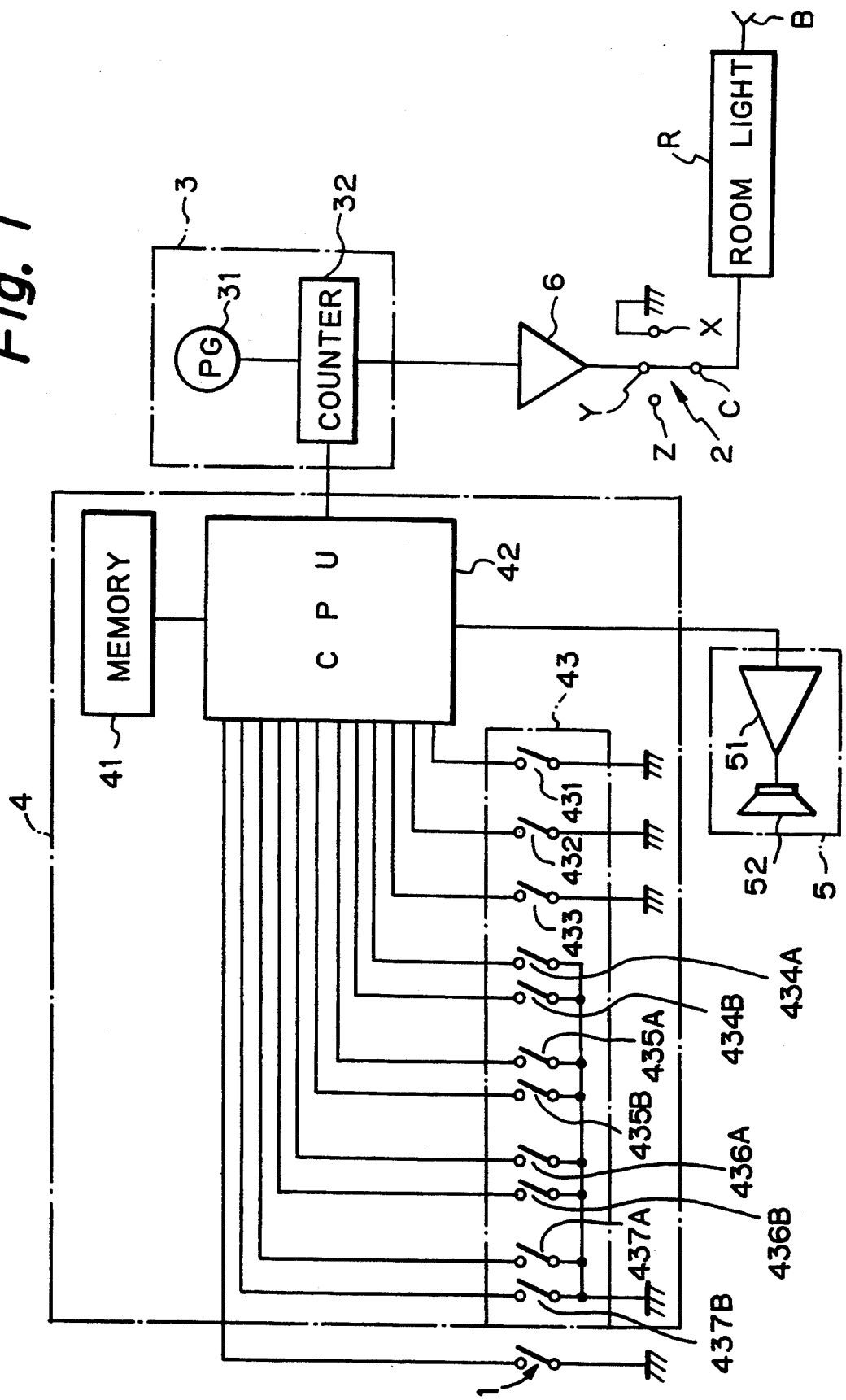
FIG. 1 is a schematic diagram of a switching apparatus for an interior light in a motor vehicle in accordance with the present invention.

FIG. 1 shows a schematic diagram of the switching apparatus for the interior light (for example, a room light R) in the motor vehicle (hereinafter referred to as "switching apparatus").

The switching apparatus turns on the room light by connecting the light to a battery B and comprises a limit switch 1, a three-position changing-over switch 2, a delay circuit 3, a regulator 4, an indicating sound generator 5, and a driver 6. One terminal of the room light R is connected to the battery B. In the switching apparatus, when the three-position changing-over switch 2 is set in a second changing-over position Y described below, the room light R is turned on and off in connection with the opening and closing of a door of the motor vehicle.

Figure 2:
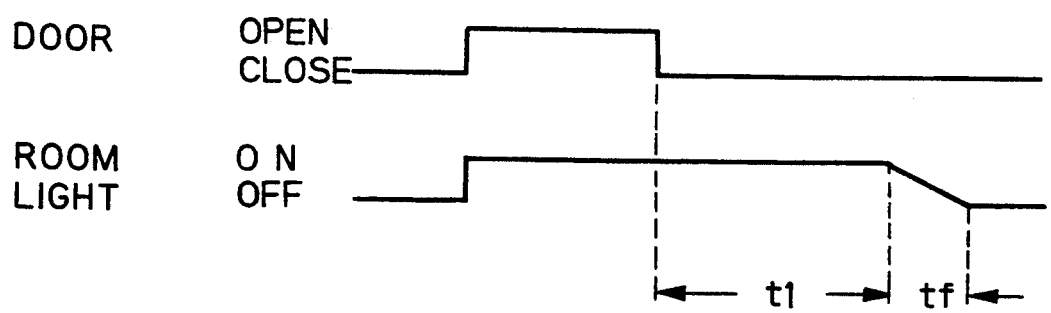
FIG. 2 is a timing chart illustrating on and off timing of a room light when a door is opened and closed, in the apparatus shown in FIG. 1.

The switching apparatus, as shown in FIG. 2, controls the turning on and off of the room light R, so that the room light R is turned on simultaneously with the opening of the door, and faded out for a fading-out period tf after the lapse of a given delay period from the line when the door is closed. Also, the switching apparatus can change the brightness of the room light R, the delay period t1 and the fading out period tf in various amount setting mode. Construction of each portion of the switching apparatus will be explained below.

The limit switch 1 is provided in an opening and closing portion in the door of the motor vehicle having the switching apparatus. The limit switch 1 is turned off when the door is closed and turned on when the door is opened.

The three-position changing-over switch 2 includes a common terminal C and first, second, and third changing-over positions X, Y, and Z. The first changing-over position X is connected to the ground and thus when the switch 2 is set in the first position X, the room light is always turned on at the maximum brightness. The second changing-over position Y is connected to the driver 6. When the switch 2 is set in the second position Y, the room light is controlled by the driver 6 between the on and off states. The third changing-over position Z is open and thus the room light is always turned off when the switch 2 is set in the third position Z.

The delay circuit 3 includes a pulse generator 31 and a counter 32. The counter 32 sends a control signal for tie starting or stopping of driving to the driver 6, when the number of pulses from the pulse generator 31 reaches a given number commanded by a computer (CPU) 42, described below.

The regulator 4 includes a memory 41, the CPU 42, and a various amount setting portion 43. The memory 41 stores various data concerning the brightness of the room light R. Also, the memory 41 stores various data concerning the delay period t1, that is, the difference between the off time of the limit switch 1 and the off time of the room light R when the limit switch 1 is turned from on to off. In addition, the memory 41 stores various data regarding the fading-out period tf (the period required for fading out) of the room light R.

The CPU 42 can change a mode from a usual mode to a various amount setting mode by the various amount setting portion 43. The CPU 42 reads out the data of the brightness delay period t1 and fading-out tf from the memory 41 on the basis of the command given by the various amount setting portion 43 in the various amount setting mode. The CPU 42 feeds a control signal generated in accordance with the data read out from the memory 41 through the delay circuit 3 to the driver 6. The CPU 42 automatically resets the various amount setting mode to the usual mode when any actions are not applied to any switches constituting the various amount setting portion 43 in the various amount setting mode.

The various amount setting portion 43 includes a group of switches for calling out the setting mode, a group of switches for setting the various amounts and a group of switches for resetting the setting mode. Although each of the switches constituting the respective groups of switches may be an exclusive use switch, there is preferably a common switch having conventional functions. Since the motor vehicle requiring such kind of switching apparatus is generally a high class motor vehicle with many and various functions, it already has many switches for effecting many functions and has little space to accommodate additional switches. This kind of switching apparatus is not meant to be set whenever the user gets into the motor vehicle, but should remain set for a long time once it has been set. It is disadvantageous for effective utilization of space in the motor vehicle to provide switches having such a low working ratio as the exclusive use switch.

In this embodiment, the group of switches for calling out the setting mode, the group of switches for setting the various amounts, and the group of switches for resetting the setting mode constitute, as shown in FIG. 1, an ignition switch 431 for the motor vehicle, a main switch 432 for a power window system, a concentrating operation switch 433 for a door lock, a descent switch 434A and a rise switch 434B for the driver's seat window in a power window system, a descent switch 435A and a rise switch 435B for the passenger's seat window in such a system, a descent switch 436A and a rise switch 436B for the back seat right window in such a system, and a descent switch 437A and a rise switch 437B for the back seat left window in such a system.

Figure 3:
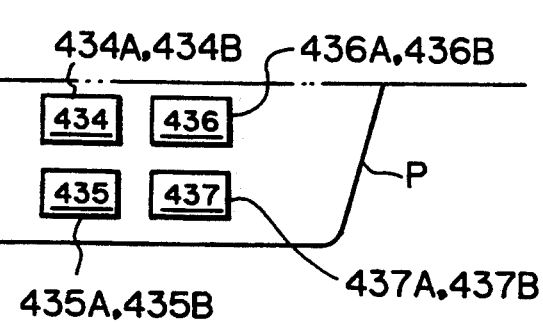
FIG. 3 is a plan view of an operation panel.

On and off information of contacts of switches 431 to 437B are all input into the CPU 42. Each of switches 432 to 437B, exclusive of the ignition switch 431 out of the above switches, as shown in, for example, FIG. 3, are concentrically disposed on an operation panel P supported on a door D of the driver's seat.

Figure 4:
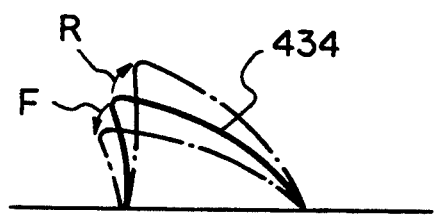
FIG. 4 is an explanatory view showing the operation manner of a descent switch and a rise switch.
Figure 5:
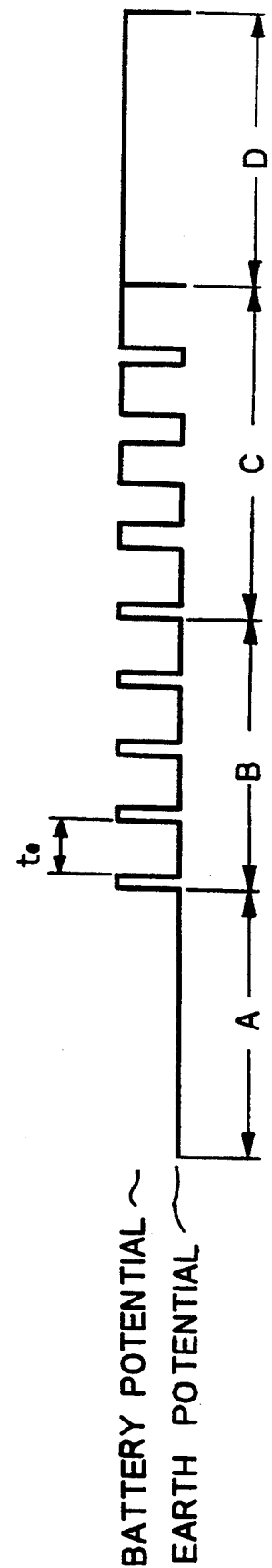
FIG. 5 shows output waves from a driver.

Descent switch 434A and rise switch 434B have a common operating portion 434, as shown in FIG. 4. The descent switch 434A is closed when the operating portion 434 is pushed down as shown by an arrow F, and the rise switch 434B is closed when the operating portion 434 is lifted up as shown by an arrow R. The other descent and rise switches 435A, 435B; 436A, 436B; and 437A, 437B have similar common operating portions 435 through 437 (see FIG. 3).

The group of switches for calling out the setting mode in the various amount setting portion 43 comprise an ignition switch 431 for the motor vehicle, a main switch 432 in the power window system, a concentric operating switch 433 for the door lock, and three descent switches 435A, 436A and 437A for the windows of the passenger's seat and the back right and left seats. This group of switches can call out the various amount setting modes by successively turning on the descent switches 435A, 436A, and 437A while keeping the ignition switch 431 for the motor vehicle and the main switch 432 in the power window system.

The group of various amount setting switches in the various amount setting portion 43 comprise descent switch 435A and rise switch 435B for adjusting brightness; descent switch 437A and rise switch 437B for adjusting the delay period t1; and descent switch 436A and rise switch 436B for adjusting the fading-out period tf.

The data, in which the brightness is increased or decreased by a step whenever the descent switch 435A or rise switch 435B is turned on once, are read out from the memory 41. Similarly, the data in which the delay period t1 is extended or shortened by a step whenever descent switch 437A or rise switch 437B is turned on once, are read out from the memory 41. Similarly, the data, in which the fading-out period tf is extended or shortened by a step whenever the descent switch 436A or rise switch 436B is turned on once, are read out from the memory 41.

The group of switches for releasing the setting mode in the various amount setting portion 43 comprise the descent switch 434A and rise switch 434B for the window of the driver's seat and the ignition switch 431. This group of switches can release the various amount setting mode and return it to the usual mode by turning on the descent switch 434A or the rise switch 434B. Also, the releasing switch 431 can release the various amount setting mode by turning on the ignition switch 431.

The indicating sound generator 5 includes a driver 51 and a buzzer 52. The driver 51 generate a driving signal which drives the buzzer 52 so that the buzzer 52 generates a different indicating sound for every indicating content in accordance with a command from the CPU 42. The indicating sound generator 4 may include an alarm generating unit for another function of the motor vehicle.

The driver 6 turns on or off the room light R in accordance with a control signal from the CPU 42 through a counter 32 in the delay circuit 3. The driver 6 generates an output of an earth potential, shown in area A in FIG. 5, when the room light R is turned on at the maximum brightness. The driver 6 generates an output of the same potential as that of the battery B, shown in area D in FIG. 5, when the room light R is turned off. The driver 6 generates outputs of the earth potential and the battery potential alternately, shown in area B in FIG. 5, when the room light is turned on at a lower brightness. In this case, the longer the continuation period te of earth potential becomes, the lower the brightness becomes. That is, the memory 41 can store the data of degree of brightness in correspondence with the continuation period of earth potential. Also, the driver 6 generates outputs of the earth and battery potentials alternately while shortening the continuation period of the earth potential and extending the continuation period of the battery potential, as shown in area C in FIG. 5, during fading out. In this case, the greater the inclination of decreasing the continuation period of the earth potential becomes, the shorter the fading-out period tf shown in FIG. 2 becomes, and the smaller the inclination becomes, the longer the fading-out period tf becomes.

Figure 6:
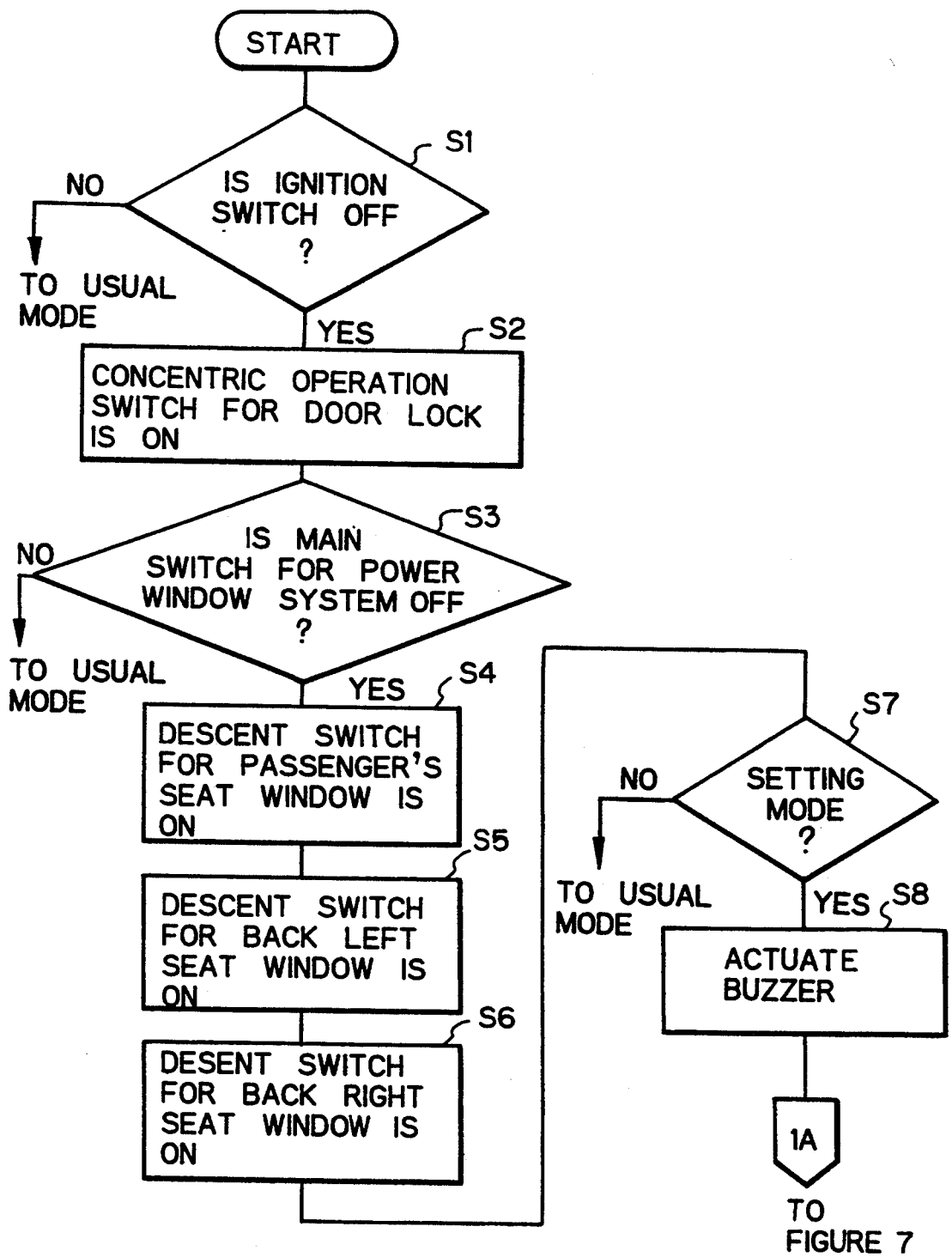
FIG. 6 is a flow chart illustrating a setting process for brightness, delay time, and fading-out time.
Figure 7:
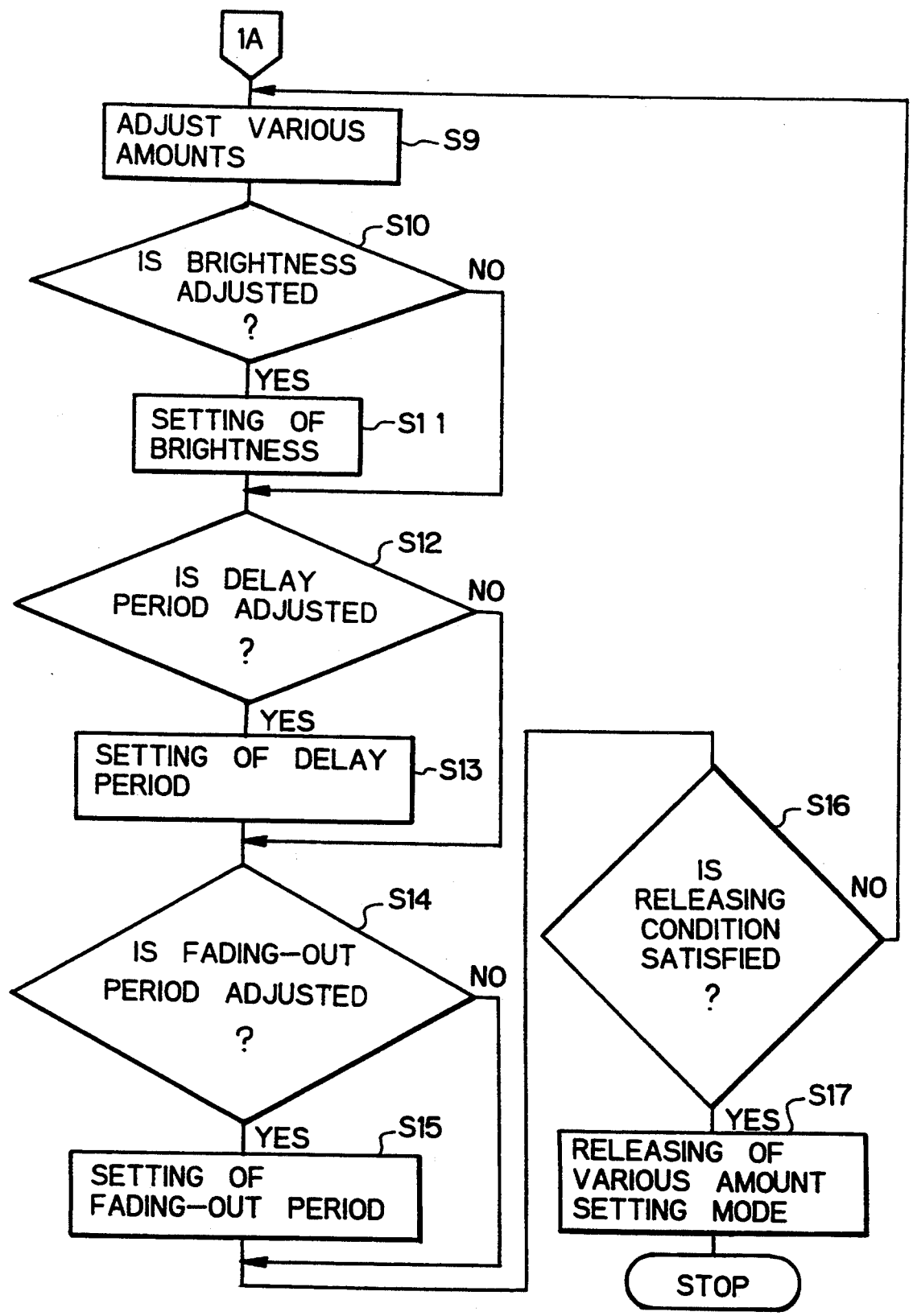
FIG. 7 is a flow chart illustrating a setting process for brightness, delay time, and fading-out time.

A process for setting the brightness delay period t1 and fading-out period tf in the switching apparatus described above will be explained in accordance with a flow chart having steps S1 to S17 shown in FIGS. 6 to 7.

Step S1 determines whether the ignition switch 431 for the motor vehicle is on or not. This prevents the switching apparatus from being set during running of the motor vehicle. If the ignition switch 431 is off at step S1, the step is advanced to step S2.

Step S2 turns on the concentric operating switch 433 for the door lock. Since the switch 433 is turned off when a pushing force is released, the switch 433 must be continued to be pushed until the setting mode is achieved. In the usual mode, the concentric operating switch 433 locks all the doors of the motor vehicle during the on state. Accordingly, step S2 is advanced to step S3 in order to decide whether the switching operation will be carried out in the various amount setting mode or in the usual mode.

Step S3 determines whether the main switch 432 for the power window system is off or not. When the main switch 432 is on, the corresponding window will descend or rise by turning off the descent switches 434A to 437A or the rise switches 434B to 437B. However, when the main switch 432 is off, the window will not rise even if the descent switches 434A to 437A and the rise switches 434B to 437B are turned off. That is, step S3 confirms that the main switch 432 is off so that the windows neither descend nor rise, even if the descent switches 434A to 437A and the rise switches 434B 437B are actuated in the setting routine described below. Step S3 is advanced to step S4 when the main switch 432 is off.

When the ignition switch 431 is on in step S2, or when the main switch 432 is on in step S3, the mode returns to the usual mode. It is necessary to carry out step S1 by turning off the ignition switch 431 and the main switch 432 in order to change the mode to the setting mode.

Steps S4 through S6 successively turn on descent switches 435A, 437A, and 436A, corresponding to the windows of the passenger's seat, and back right and left seats.

Step S7 determines whether steps S1 through S6 have been correctly carried out, that is, the steps have entered into the setting mode. If they have entered into the setting mode, the step is advanced to step S8, and if they have not entered, the mode will return to the usual mode.

Step 8 actuates the buzzer 52 informing that the mode has entered into the setting mode.

The various amount setting mode is called out by steps S1 through S8. If the intervals between steps S4 and S5, between steps S5 and S6, and between steps S6 and S7 in the routine of steps S1 through S8 reach more than a given interval, a step for returning the mode to the usual mode may be added.

If the buzzer 52 is actuated at step S8, the routine is advanced to the following steps.

Step S9 adjusts the various amounts, such as the brightness of the room light R, delay period t1, and fading-out period tf.

Step S10 determines whether the adjustment of brightness has been carried out, that is, whether descent switch 435A or rise switch 435B has been actuated. If the adjustment of brightness has been carried out at step S10, the step is advanced to step S11. At step S11, the CPU 42 reads out the data corresponding to the adjusting amount of brightness at step S9 from the memory 41, and the step is advanced to step S12 after the brightness is adjusted in accordance with the data.

Step S12 determines whether the delay period t1 has been adjusted, or whether the descent switch 436A or the rise switch 436B has been actuated. If the delay period t1 has been adjusted, the step is advanced to step S13. At step S13, the data corresponding to the adjusting amount of the delay period t1 at step S9 are read out from the memory 41, and the step is advanced to step S14 after the delay period t1 is adjusted in accordance with the data. If the delay period t1 has not been adjusted at step S12, the step is directly advanced to step S14.

Step S14 determines whether the fading-out period tf has been adjusted, or whether the descent switch 436A or the rise switch 436B has been actuated. If the fading-out period tf has not been adjusted at step S14, the step is advanced to step S15. At step S15, the data corresponding to the adjusting amount of the fading-out period tf at step S9 are read out from the memory 41, and the step is advanced to step S16 after the fading-out period tf is set in accordance with the data. If the fading-out period tf has not been adjusted at step S14, the step is advanced to step 16.

Step S16 determines a releasing condition, that is, (1) whether the ignition switch 431 is turned on, (2) whether the descent switch 434A or the rise switch 434B for the driver's seat window is turned on, or (3) that any switch has not been actuated for more than a given period. When all of the above releasing conditions (1) to (3) are satisfied in, step S16, the step is advanced to step S17 and the various amount setting mode is released. If any one of the above releasing conditions (1) to (3) is not satisfied in step S16, the step is returned to step S9 and the preceding routine is repeated.

Thus, the brightness of the room light R, the delay period t1 from the time when the door was closed and the time when the room light R is turned off, and the fading-out period tf at the turning off of the light are set. Then, when the three position changing over switch 2 selects the second changing-out position, that is, when common terminal C is connected to contact Y, control signals, including information concerning the above set brightness, delay period t1 and fading-out period tf are generated from the CPU 42 whenever the door is opened and closed.

When the three position changing-over switch 2 selects the second position and the door is opened, the CPU 42 sends control signals to the counter 32 to commence the driving, including information of the above set brightness and the delay period (t1=0). The counter 32 sends the control signal to the driver 6 without any delay. The driver 6 sends a drive signal to the room light for turning on the room light R.

Also, when the three position changing-over switch 2 selects the second changing-over position and the door is closed, the CPU 42 sends to the counter 32 control signals 22 for stopping the driving, including information of the delay period t1 and the fading-out period tf set in the routine of steps S1 through S16. The counter 32 sends the control signals for stopping the driving to the driver 6 when the number of pulses from the pulse generator 31 reaches the number of pulses corresponding to the set delay period t1 after receiving the control signals. The driver 6 turns off the room light R while gradually lowering the brightness for the set fading-out period tf by generating a driving signal shown in area C in FIG. 5 when the driver 6 receives the; control signal for stopping the driving.

It is possible in this switching apparatus for the user to set the brightness of the room light after closing the door, the delay period t1 from the time when the door is closed to the time when the light is turned off, and the fading-out tf upon turning off. Since the above settings can be effected by utilizing the switches in the conventional system, including time power window system, it is not necessary to provide an exclusive setting switch. Thus, space for the operating panel in the motor vehicle is not reduced.

Although in the above described embodiment the user can set the brightness of the room light R delay period, and fading-out period, the user may choose to set only the delay period in the present invention. The present invention can be applied to a room light other than time room light R, for example, a key illuminating light.

Although in the above embodiment the light-on command is issued by closing time limit switch 1 when the door is opened, and the light-off command is issued by opening the limit switch 1 when the door is closed, the light-off command may be issued simultaneously with the light-on command by closing the limit switch 1. That is, the period of illumination after turning on the light may be the delay period after issuing the light-off command.

With the present invention, it is possible to set the on-period of the room light after issuing the off-command in compliance with the user's choice or the condition of use of the motor vehicle, and it is also possible to improve the flexibility of the motor vehicle.

What is claimed is:

1. A switching system for a motor vehicle whereby an interior light is controlled according to received ones of an on signal and an off signal generated by a signaling device, comprising:
   a regulator responsive to said off signal generating a number; and
   a delay circuit responsive to said number for generating a delay period corresponding to a period of time from receipt of said off signal until said light is to be turned off,
   wherein said regulator comprises a memory storing delay data and a microprocessor generating said number in response to said data.

2. The switching system according to claim 1, wherein said delay circuit comprises a counter and wherein said number is applied to said counter so as to permit said light to be turned off.

3. The switching system according to claim 1, wherein termination of said delay period initiates a fade out period whereby a predetermined magnitude of said light is reduced over a programmed period to zero.

4. The switching system according to claim 3, wherein said fade out period corresponds to alternating periods wherein said light is subjected to battery voltage and said light is subjected to ground potential.

5. A method for controlling a switching system for a motor vehicle whereby an interior light is controlled according to received ones of an on signal and an off signal generated by a signaling device, said method comprising the steps of:
   (a) generating a digital value in response to receipt of said off signal;
   (b) counting a plurality of pulse signals until the number of pulses counted corresponds to said digital value; and
   (c) generating a control signal to initiate transition of an on state of said light to and off state of said light.

6. A method recited in claim 5, wherein said step (c) comprises:
   (a) generating said control signal to initiate transition of an on state of said light to an off state of said light in response to alternative applications of a battery potential and ground potential in a programmed pattern.

7. The method recited in claim 6, wherein said programmed pattern specifies lengths of said alternative applications whereby a first period wherein said battery potential is applied is gradually lengthened and wherein a second period wherein said ground potential is applied is gradually shortened.

8. The method recited in claim 6, wherein said step (c) comprises:
   (c) generating said control signal to initiate transition of an on state of said light to said off state of said light in response to alternative applications of said battery potential and said ground potential in said programmed pattern so as to produce a gradual fading of illumination from said light.

9. A method for programming a switching system for a motor vehicle whereby an interior light is controlled according to received ones of an on signal and an off signal generated by a signaling device and including a microprocessor and associated memory, wherein said microprocessor is connected to a plurality of switches, said method comprising the steps of:

(a) operating a plurality of first switches of said switches each for at least a respective predetermined period of time to thereby initiate a setting mode of operation in said microprocessor; and (b) positioning a plurality of second switches of said switches to set respective stored data values corresponding to operating parameters whereby said light is switched from an on state to an off state under the control of said microprocessor in said memory.

10. The method recited in claim 9, wherein said method further comprises the step (c) of:

verifying that a selected one of said switches is in a predetermined position, wherein said selected one of said switches is different from said first switches and said second switches, and wherein said step (c) is performed prior to performing said step (a).

11. The method recited in claim 10, wherein each of said first switches and said second switches have a normal mode of operation and a programming mode of operation, and wherein an operative one of said normal mode of operation and said programming mode of operation depends on whether said selected one of said switches is in said predetermined state.

* * * * *